US012675267B2

(12) United States Patent (10) Patent No.: US 12,675,267 B2
Cowan et al. (45) Date of Patent: Jul. 7, 2026

(54) PROGRAM CODE OPTIMIZATION USING ITERATIVE APPLICATION OF MACHINE LEARNING MODEL

(71) Applicant: International Business Machines Corporation, Armonk, NY (US)

(72) Inventors: Don Cowan, San Francisco, CA (US); Jesus Manuel Olivera, New York, NY (US); Brian Scott Paskin, Somerville, MA (US); Hicham Badawi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 18/510,627

(22) Filed: Nov. 15, 2023

(65) Prior Publication Data

US 2025/0156161 A1 May 15, 2025

(51) Int. Cl.
*G06F 8/41* (2018.01)
*G06F 40/20* (2020.01)

(52) U.S. Cl.
CPC .............. *G06F 8/443* (2013.01); *G06F 40/20* (2020.01)

(58) Field of Classification Search
CPC ................................. G06F 8/443; G06F 40/20
USPC ......................................................... 717/151
See application file for complete search history.

(56) References Cited

U.S. PATENT DOCUMENTS 8,799,693 B2 8/2014 Vick et al.
9,483,295 B2 11/2016 Gschwind
9,977,439 B2 5/2018 Park et al.

10,474,455 B2 * 11/2019 Makkar ................... G06F 40/30
10,481,879 B2 11/2019 Stevens
10,635,409 B2 4/2020 Pradhan
11,579,868 B1 2/2023 Zhang
11,604,642 B2 3/2023 Jayapandy
12,288,045 B2 * 4/2025 Verma ....................... G06F 8/70
2006/0001044 A1 1/2006 Yamada et al.
2006/0010441 A1 1/2006 Hisashi
2006/0101440 A1 5/2006 Stay et al.
(Continued)

OTHER PUBLICATIONS

Wang, Song, et al. "Automatic unit test generation for machine learning libraries: How far are we?." 2021 IEEE/ACM 43rd International Conference on Software Engineering (ICSE). IEEE, 2021. pp. 1548-1560 (Year: 2021).*
(Continued)

*Primary Examiner* — Satish Rampuria

(74) *Attorney, Agent, or Firm* — Onyx IP Group

(57) ABSTRACT

A computing device may insert a library function into a set of code. The computing device may use the library function to capture one or more metrics associated with execution of the set of code in a testing environment. The computing device may evaluate the processing times to identify a portion of the set of code with a processing time that is highest compared to processing times of other portions of the set of code. The computing device may subdivide the portion of the set of code into subdivided portions of the set of code. The computing device may train a machine learning model, utilizing the subdivided portions of the set of code, to obtain a trained model. The computing device may recommend, using the trained machine learning model, optimization code to improve the processing time as the set of code is modified.

20 Claims, 12 Drawing Sheets

(56) References Cited

U.S. PATENT DOCUMENTS

| | | | |
|---|---|---|---|
| 2010/0042976 A1 | 2/2010 | Hines | |
| 2010/0180255 A1 | 7/2010 | Chung | |
| 2015/0379429 A1* | 12/2015 | Lee | G09B 5/00 |
| | | | 706/11 |
| 2017/0212829 A1 | 7/2017 | Bales | |
| 2019/0220253 A1 | 7/2019 | Pradhan et al. | |
| 2019/0243617 A1 | 8/2019 | Stevens et al. | |
| 2020/0356901 A1* | 11/2020 | Zarandioon | G06N 20/00 |
| 2021/0182039 A1* | 6/2021 | Cappello | G06N 20/00 |
| 2022/0027134 A1 | 1/2022 | Ivankovic | |
| 2022/0129254 A1 | 4/2022 | Chang | |
| 2022/0214874 A1 | 7/2022 | Jayapandy et al. | |
| 2023/0108808 A1* | 4/2023 | Lerman | G06N 5/01 |
| | | | 717/104 |
| 2023/0128680 A1* | 4/2023 | Carranza | G06F 18/232 |
| | | | 706/12 |
| 2025/0036377 A1* | 1/2025 | Verma | G06F 8/70 |

OTHER PUBLICATIONS

Medeiros, Nadia, et al. "Vulnerable code detection using software metrics and machine learning." IEEE Access 8 (2020): pp. 219174-219198. (Year: 2020).*

Dutta, Saikat, et al. "Tera: Optimizing stochastic regression tests in machine learning projects." Proceedings of the 30th ACM SIGSOFT International Symposium on Software Testing and Analysis. 2021. pp. 413-426 (Year: 2021).*

Stephenson, Mark, et al. "Meta optimization: Improving compiler heuristics with machine learning." ACM sigplan notices 38.5 (2003): pp. 77-90. (Year: 2003).*

Dehaerne, Enrique, et al. "Code generation using machine learning: A systematic review." Ieee Access 10 (2022): pp. 82434-82455. (Year: 2022).*

Le, Triet HM, Hao Chen, and Muhammad Ali Babar. "Deep learning for source code modeling and generation: Models, applications, and challenges." ACM Computing Surveys (CSUR) 53.3 (2020): pp. 1-38. (Year: 2020).*

Natalia Szydlowska, Green Software Development:Energy Efficient Programming Languages, Tools and Practices in Coding, online article, Sep. 19, 2022, pp. 2-17, retrieved from https://betterprogramming.pub/thinking-about-software-sustainably-ebdc0d9b0f23, on Jun. 8, 2023.

Green coding: A sustainability practice all software engineers should adhere to, Jun. 8, 2023, pp. 1-2, https://curiosum.com/blog/green-coding-software-development-energy-efficient-programming-languages, on Jun. 8, 2023.

Johanne Andersen, Thinking about Software Sustainably, online article, Jun. 15, 2020, pp. 1-7, Better Programming, retrieved from https://www.computerweekly.com/blog/Green-Tech/Green-coding-A-sustainability-practice-all-software-engineers-should-adhere-to, on Jun. 8, 2023.

Geeksforgeeks, How to measure time taken by a function in C, online article, Jun. 21, 2022, pp. 1-6, retrieved from https://www.geeksforgeeks.org/how-to-measure-time-taken-by-a-program-in-c/, on Jun. 8, 2023.

Tutorialsteacher, How to calculate the code execution time in C#, Jun. 8, 2023, online article, pp. 1-5, retrieved from https://www.tutorialspoint.com/how-to-measure-execution-time-for-a-java-method on Jun. 8, 2023.

Tutorialspoint, How to measure execution, time for a java method, online article, Jun. 8, 2023, online article, pp. 1-2, retrieved from https://www.tutorialspoint.com/how-to-measure-execution-time-for-a-java-method on Jun. 8, 2023.

* cited by examiner

100

300

315
Generate a set of code

User device
305

320
Store the generated set of code

Generated code data store
310

Processing Times Library Function

```
capture_processing_times()
calculate_processing_times_usage(start, end)
store_processing_times(program_name, block_name, block_type, code_improvement_type,
processing_times, data_store)
```

300

325

Wrap the generate set of code in a library function

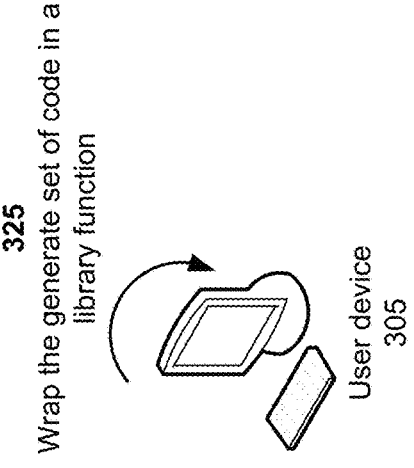

User device
305

The Set of Code wrapped in Processing Times Library Function

```
capture_switch_on = True

...

application_x():
    import processing_times_functions
    function_a():
        if capture_switch_on:
            block_start_times = capture_processing_times()

. code statement(s)

if capture_switch_on:
            block_end_times = capture_processing_times()
            block_times_usage = calculate_processing_times_usage(block_start_times,
block_end_times)
            store_processing_times('application_x', 'clode_block_a', 'function',
'parallel_processing', block_times_usage, 'data_store_y')
```

340
Retrieve the first metrics

User device
305

345

Evaluate the first metrics to identify a
portion of the set of code to be
optimized Processing
times data
store
140

300

Processing times data store 140

365
Capture second metrics associated with execution of the first optimized code User device 305

370
Store the second metrics

375
Evaluate the second metrics to identify a portion of the first optimized code

400

610 Insert a library function into a set of code

620 Capture one or more metrics associated with execution of the set of code

630 Identify a portion of the set of code

640 Subdivide the portion of the set of code

650 Train a machine language model

660 Recommend optimization code to improve the processing time

600

PROGRAM CODE OPTIMIZATION USING ITERATIVE APPLICATION OF MACHINE LEARNING MODEL

BACKGROUND

The present invention relates to program code optimization and, for example, to iteratively optimizing program code using a machine learning model. Software developers and engineers work to design and configure complex systems. As part of designing and configuring the complex systems, the software developers may develop code to support the complex systems.

SUMMARY

A computer-implemented method, for optimizing computer code, may comprise inserting a library function into a set of code; capturing, using the library function, one or more metrics associated with execution of the set of code in a testing environment; identifying, based on the one or more metrics, a portion of the set of code with a processing time that is highest compared to processing times of other portions of the set of code; subdividing the portion of the set of code into subdivided portions of the set of code; training a machine learning model, utilizing the subdivided portions of the set of code, to obtain a trained model; and recommending, using the trained machine learning model, optimization code to improve the processing time as the set of code is modified.

A computer program product comprising: one or more computer readable storage media, and program instructions collectively stored on the one or more computer readable storage media, the program instructions may comprise program instructions to program instructions to insert performance monitoring code of a library function into a set of code running in a testing environment; program instructions to capture, using the performance monitoring code, performance metrics associated with execution of the set of code; program instructions to evaluate the metrics to identify a code block, of a plurality of code blocks of the set of code, with a processing time that is highest among processing times of the plurality of code blocks; program instructions to generate, using a machine learning model, a recommendation to divide the set of code to reduce the processing time; and program instructions to provide the recommendation to modify the set of code.

A system comprising: one or more devices may be configured to: insert performance monitoring code into a set of code; capture, using the performance monitoring code, performance metrics associated with execution of the set of code; evaluate the metrics to identify a code block, of a plurality of code blocks of the set of code, with a processing time that is highest among processing times of the plurality of code blocks; generate, using a machine learning model, optimization code that reduces the processing time; and cause the optimization code to replace the set of code to reduce the processing time.

BRIEF DESCRIPTION OF THE DRAWINGS

FIGS. 3A-3G are diagrams of an example implementation described herein.

DETAILED DESCRIPTION

Figure 1:
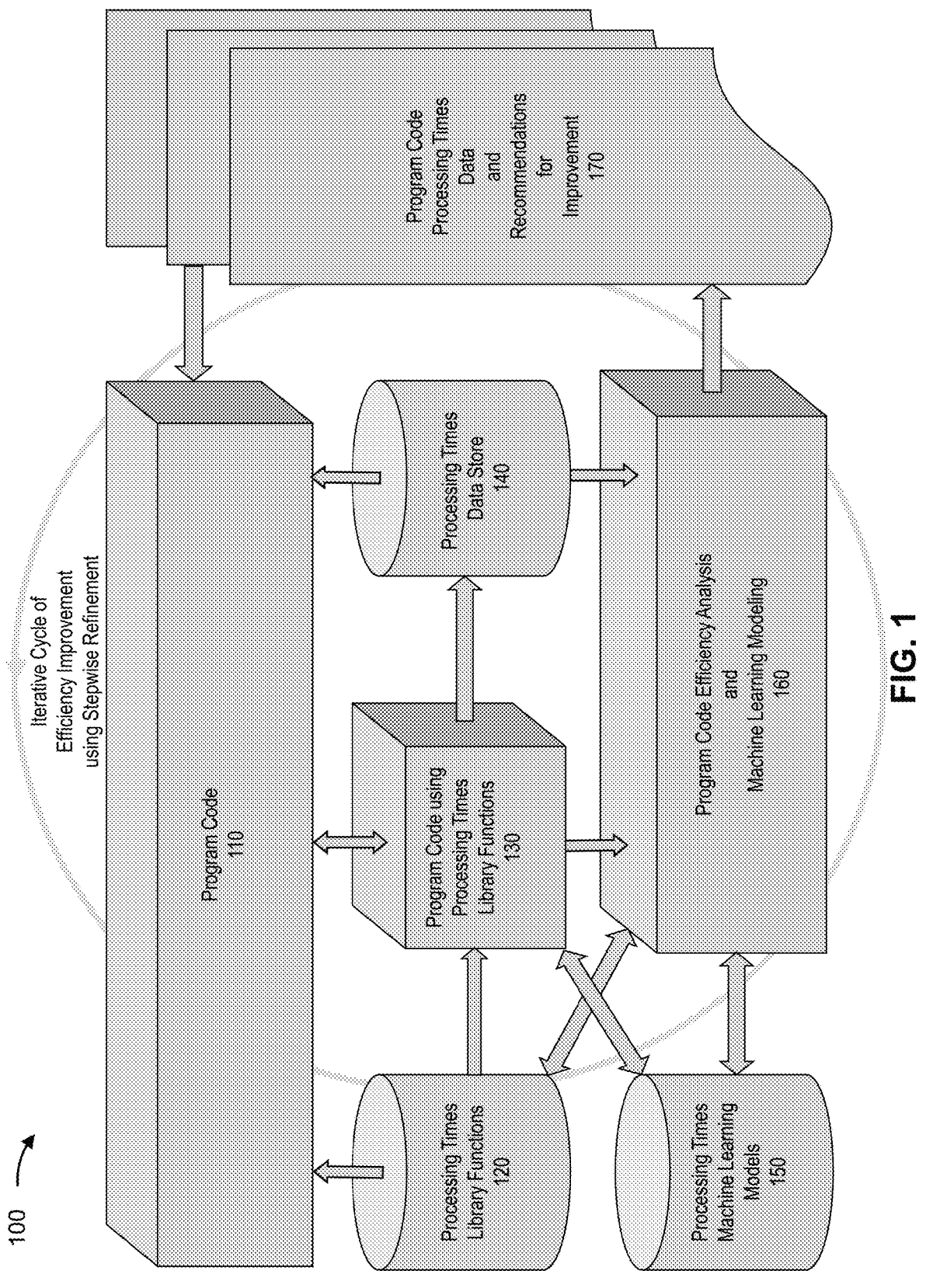
FIG. 1 is a diagram of an example architecture described herein.

The following detailed description of example implementations refers to the accompanying drawings. The same reference numbers in different drawings may identify the same or similar elements.

Software designs and implementations have increased in complexity with advancements in hardware capabilities and technology. In this regard, software developers are developing code to support complex systems. As the level of complexity of the systems increases, the code utilizes increasingly extensive cycles of development that result in an increasing amount of resource consumption.

For example, the code may consume an increasing amount of computing resources (e.g., an increasing number of computing cycles). Additionally, or alternatively, the code may consume an increasing amount of storage resources to store the code as the size of the code increases with the level of complexity of the systems.

In some situations, a software developer may attempt to manually optimize the code. However, manually optimizing the code may be a time-consuming process because of the size of the code. For example, attempting to manually optimize numerous lines of code may be a time-consuming process. Additionally, or alternatively, manually optimizing the code may be subject to human errors. For example, improper portions of the code may be selected for optimization. Additionally, or alternatively, errors may be introduced in the code during the process of optimizing the code. For at least the foregoing reasons, a need exists for improving the optimization of code.

Implementations described herein provide solutions to overcome the above issues relating to optimizing code. For example, implementations described herein are directed to evaluating code, using a machine learning model, to provide developers with a feedback loop using stepwise refinements. By evaluating the code as described herein, implementations described herein improve processing performance of the code by causing the code to utilize the least amount of resources as possible. As used herein, "code" may be used to refer to a computer program code. For example, the code may include program source code. In other words, the code may include instructions that are configured to be executed by a computing device.

In some examples, implementations described herein may evaluate the code to identify portions of the code with high processing times (e.g., processing times that exceed a processing time threshold). The processing times may include a program processing time, a system processing time, and a clock processing time.

The program processing time may refer to processing time used specifically by an application software associated with the code. The system processing time may refer to processing time used by an underlying operating system in support of the application software. The clock processing time may refer to the elapsed clock time used by the application software.

In some examples, implementations described herein may utilize stepwise refinements to iteratively analyze the portions of the code for increased refinement in order to reduce processing time and, accordingly, reduce the amount of resources consumed. As used herein, "stepwise refinements" may refer to an iterative process by which the portions of the code may be analyzed to identify one or more specific sections (e.g., one or more lines of code) that are associated with the highest processing times. The one or more specific sections may be optimized in order to reduce an overall processing time associated with the code.

For example, during a first iteration, a portion of the code may be identified; during a second iteration, a section of the portion of the code may be identified; during a third iteration, a subsection of the section of the portion of the code may be identified; and so on until a line of code associated with the highest processing time is identified. In other words, the code may be analyzed on a program level (e.g., an entirety of the code), on a function level (e.g., a function of the code), and/or on a statement level (e.g., one or more statements of the function), among other examples. In some instances, during each iteration, optimized code may be generated and provided as feedback as the code is being developed and/or modified.

In some examples, the code may be developed in a testing environment. A portion of the code may be wrapped in a library function that is configured to capture (or obtain) processing times. For example, by wrapping the code wrapped in the library function, first library code of the library function may be inserted before the portion of the code and a second portion of the library code may be inserted after the portion of the code. In other words, the portion of the code may be inserted between library code of the library function.

The library function may be used to measure resource utilization of the code. For example, the library function may be used to identify code blocks associated with high levels of processor usage (e.g., processor usage that exceed a processor usage threshold). As used herein, a "code block" may refer to a portion of code.

In some examples, the library function may be used to capture processing data regarding the portion of the code and the processing times. The processing data may identify monitoring metrics, such as the program processing time, the system processing time, and the clock processing time. The processing data may be stored in a data store and may be subsequently retrieved and analyzed to identify one or more code blocks with highest processing times out of processing times of different code blocks of the portion of the code.

Based on analyzing the processing data, a recommendation may be generated. As an example, the recommendation may include dividing the one or more code blocks. In some situations, the recommendation may be provided as the code is being developed and/or as the code is being updated. For example, as part of the iterative process, a recommendation may be generated and provided to a software developer during each iteration of optimizing the code. In some instances, the code may be optimized with respect to code loops, machine learning inference, data reading operations, and/or data writing operations.

The recommendation may be generated by a machine learning model. In some examples, the machine learning model may be trained using the processing data and the portion of the code. The machine learning model may be trained to analyze and predict improvement techniques to improve and optimize the portion of the code.

In some examples, the machine learning model may be a large language model trained to generate optimized code that is an optimized version of the portion of the code. The optimized code may reduce the processing time associated with execution of the portion of the code. In some instances, the machine learning language may provide recommendations for optimization of the code with respect to code loops, machine learning inference, data reading operations, and/or data writing operations.

Implementations described herein provide several advantages and benefits over existing methods of optimizing code. For example, implementations described herein may enable continuous improvement of the code using machine learning models to provide code optimization solutions. Additionally, or alternatively, implementations described herein may enable an evaluation mechanism for software development and for optimizing legacy software (e.g., existing software).

Additionally, or alternatively, implementations described herein may help an organization understand the amount of resources used by the software, understand any environmental impact associated with the code being used by the organization, and the impact on the practices of the organization. By reducing the amount of resources consumed, implementations described herein may enable the organization to reach the goals of achieving improved levels of sustainability, to follow the environmental impact along with social and governance framework, and reduce the environmental footprint of the organization.

Implementations described herein may improve software efficiency in software products. Implementations described herein may provide users the ability to better understand the resources needed when enabling the data layer and to better align the needs with the optimization requirements from a coding perspective.

In some situations, the high processing times may be caused by calling an external system (that is external to a host system that hosts and/or executes the code) and waiting for a response from the external system. Additionally, or alternatively, the high processing times may be caused by storing information in a data store.

While the examples described herein are directed to processing times, implementations described herein are applicable to other performance metrics. For examples, implementations described herein are applicable to central processing unit (CPU) usage, memory consumption, graphical processing unit (GPU) usage, among other examples.

FIG. 1 is a diagram of an example architecture 100 described herein. As shown in FIG. 1, architecture 100 may include program code 110 and processing times library functions 120. Program code 110 may include computer program code 110 in various computer programming languages. In this regard, implementations described herein may be computer programming language and infrastructure agnostic. In other words, implementations described herein may be independent of a computer programming language and of a computer programming architecture.

Processing times library functions 120 (hereinafter referred to as "library functions 120") may include computer program code that is configured to obtain processing times of different portions of program code 110. In some examples, library functions 120 may be inserted in program code 110 to generate program code using processing times library functions 130 (hereinafter referred to as "modified program code 130"). In some examples, program code 110, library functions 120, and/or modified program code 130 may be stored in one or more data stores.

As shown in FIG. 1, architecture 100 may further include processing times data store 140 and processing times machine learning models 150 (hereinafter referred to as "machine learning models 150"). Processing times data store 140 may include a database or the like in a data structure (e.g., a table, and/or a linked list or the like) that is configured to store the processing times obtained using library functions 120.

Machine learning models 150 (individually referred to as "a machine learning model 150") may include machine learning modes configured to predict code optimization improvements for program code 110. For example, machine learning models 150 may be trained to analyze program code 110 and/or the processing times to generate recommendations for optimizing program code 110. Machine learning models 150 may include one or more large language models.

Machine learning models 150 may generate the recommendations as program code efficiency analysis and machine learning modeling 160 (hereinafter "analysis and modeling 160"). For example, analysis and modeling 160 may represent the recommendations (e.g., suggestions for code modification) and may represent incremental training of machine learning models 150 using the recommendations. In some examples, the recommendations may include subdividing program code 110.

Program code processing times data and recommendations for improvement 170 may refer to recommendations for additional analysis of program code 110. For example, program code 110 may be analyzed to determine whether program code 110 is to be further subdivided.

Implementations described herein are directed to an iterative cycle of efficiency improvement of program code 110 using a stepwise refinement. In this regard, program code 110 may be iteratively analyzed and a recommendation may be generated during each iteration until a selected level of overall processing time is achieved.

Implementations described herein may involve multiple components including a coding component, a processing component, an analysis component, and a feedback component. With respect to the coding component, program code 110 may be developed (e.g., in a testing environment). In some examples, program code 110 may be generated using a machine learning model, such as a machine learning model 150. A code block of program code 110 may be wrapped in one or more library functions 120. Processing times, associated with executing the code block, may be obtained using the one or more library functions 120.

With respect to the processing component, monitoring metrics regarding the processing times may be obtained using the one or more library functions 120 and may be stored in processing times data store 140. With respect to the analysis component, the monitoring metrics may be retrieved from processing times data store 140 and may be evaluated to identify one or more code blocks associated with highest processing times out of processing times of code blocks of program code 110. For example, a machine learning model 150 may analyze the one or more code blocks and may predict a recommendation for optimizing (or improving) the one or more code blocks. For example, the recommendation may include subdividing the one or more code blocks into divided code blocks (e.g., smaller code blocks with a size that is less than a size of the one or more code blocks).

With respect to the feedback component, the one or more divided code blocks may be wrapped in library functions 120. Library functions 120 may be used to obtain additional processing times of the one or more divided code blocks. The additional processing times may be analyzed using a machine learning model 150 and the machine learning model 150 may generate a recommendation to further divide the one or more divided code blocks. The recommendation may be provided during a development of program code 110.

As indicated above, FIG. 1 is provided as an example. Other examples may differ from what is described with regard to FIG. 1. The number and arrangement of elements shown in FIG. 1 are provided as an example.

Figure 2:
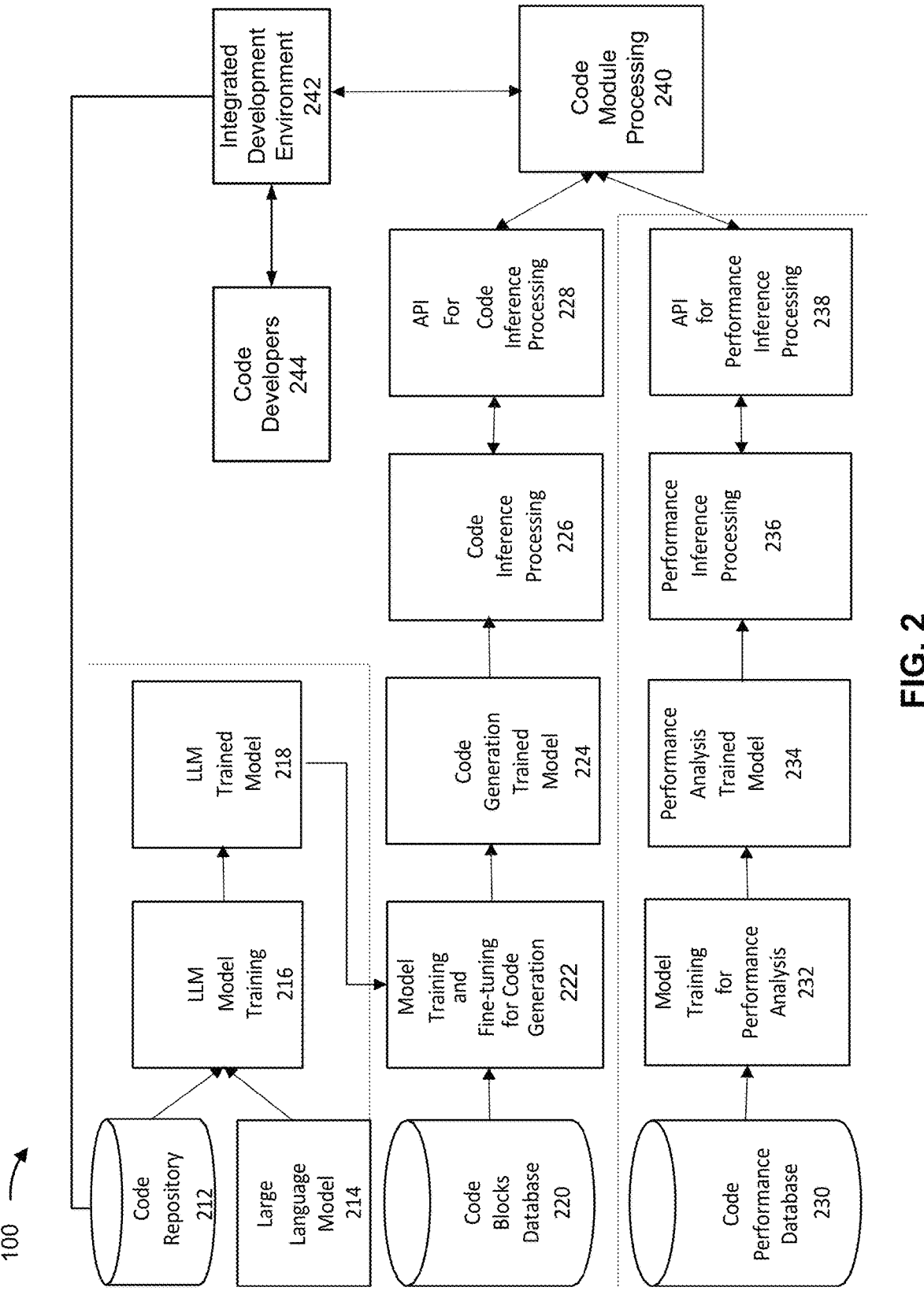
FIG. 2 is a diagram of an example training and processing described herein.

FIG. 2 is a diagram of an example training and processing implementation 200 described herein. As shown in FIG. 2, training and processing implementation 200 may include a code repository 212 and a large language model (LLM) 214. Code repository 212 may include a repository for storing program source code. For example, code repository 212 may store computer programming code, such as program code 110. In some implementations, the program source code may be used as model training input for large language models that are to be fine-tuned for generating program code.

Large language model 214 may be machine learning model selected from a plurality of machine learning models, as a good foundation for fine-tuning for generating program code. In some examples, the plurality of machine learning models may be trained on a broad set of unlabeled data that may be used for different tasks with minimal fine-tuning. Using self-supervised learning and fine-tuning, the plurality of models may apply information learned to a specific task, such generating program code.

Large language model 214 may be built on a transformer structure that includes an encoder and a decoder. As shown in FIG. 2, and by reference number 216, large language model 214 may be trained. In some examples, large language model 214 may be trained using self-supervised methods on unlabeled data to predict word sequence. Large language model 214 may be trained to obtain trained large language model 218. In some implementations, trained language model 214 may be trained to perform tasks, such as performing next word prediction and implementing a chain-of-though prompting technique.

As shown in FIG. 2, architecture 100 may include a code blocks database 220. Code blocks database 210 may include a data store configured to store code blocks. The code blocks may be sequences of programming code recommended by large language model 214. In some implementations, the code blocks may be wrapped in library functions, as explained herein.

As shown in FIG. 2, and by reference number 222, large language model 214 may be fine-tuned (e.g., further trained). For example, large language model 214 may be fine-tuned by way of a prompt-tuning technique. The prompt-tuning technique may be used for supervised learning fine-tuning to enable large language model 214 to generate program code. Large language model 214 may be fine-tuned to generate code generating trained model 224. In some examples, code generating trained model 224 may be trained to generate recommendations to optimize program code 110. For instance, code generating trained model 224 may be trained to predict program code to optimize program code 110.

As shown in FIG. 2, training and processing implementation 200 may include a code inference processing 226. In some examples, an input to code inference processing 226 may include the code description text captured from the code module via an application programming interface (API). Code inference processing 226 may be a module that constructs inputs and passes them to a trained model, invokes model inference, and receives the inference response. In some situations, code inference processing 226 may provide input to code generating trained model 224. Alternatively, code inference processing 226 may receive input from code generating trained model 224.

As shown in FIG. 2, training and processing implementation 200 may include an API for code inference processing 228. In some examples, API for code inference processing 228 may include a code module hosted in a server accessible via the Internet. API for code inference processing 228 may provide an interface between code developers that use an integrated development environment (IDE) and code inference processing 226.

As shown in FIG. 2, training and processing implementation 200 may include a code performance database 230. Code performance database 230 may include a database or the like in a data structure, e.g., a table, and/or a linked list or the like, that stores data regarding the performance of code blocks. For example, code performance database 230 may store processing time data identifying processing times of the code blocks. The processing times data may be obtained using library functions 120.

As shown in FIG. 2, and by reference number 232, a large language model (such as trained large language model 218) may undergo performance analysis to obtain a performance analysis trained model 234. As an example, the large language model may be trained using a prompt-tuning technique that is used for supervised learning fine-tuning. As a result, performance analysis trained model 234 may be configured for code generation. For example, performance analysis trained model 234 may be used to suggest program code to code developers.

As shown in FIG. 2, training and processing implementation 200 may include a performance inference processing 236. In some examples, input to performance inference processing 236 may be data captured from the code module via an API for performance inference processing 238. Performance inference processing 236 may construct inputs and may pass the inputs to a trained model, may invoke model inference, and may receive an inference response. Performance inference processing 236 may suggest a code optimization that is constructed as code suggestions based on performance of the code. This code optimization may then be provided to the trained model for further optimization.

As shown in FIG. 2, training and processing implementation 200 may include a code module processing 240. In some examples, code module processing 240 may interact between the IDE and API for performance inference processing 238 for code fragment and performance data send/ receive. For example, code module processing 240 may receive code from a user and may leverage the code as input with respect to potential optimization recommendations (model inference). Code module processing 240 may also leverages the code (from the user) as input to performance inference processing 238 for potential code generation.

As shown in FIG. 2, training and processing implementation 200 may include an IDE 242. In some examples, IDE 242 may provide easy to use capabilities for developing code, may interface with code module processing 240, may interface with inference processing, and may interface with code generation. In some situations, program code developed using IDE 242 may be provided to code repository 212 for storage.

As shown in FIG. 2, in some situations, training and processing implementation 200 may include code developers 244. Code developers 244 may utilize computing devices to write (or develop) computer programming code, such as program code 110. In some examples, the computer programming code may include library functions that interface with code inference processing 226 and with performance inference processing 236. For example, the computer programming code may be processed by code inference processing 226 and provided to performance inference processing 236 for optimization recommendations. The library of functions may be built into a specific programming language or prepended to libraries external to the programming language. The library functions may perform actions such as gathering system and application performance data and providing code blocks that are useful for enhancing application code. Code developers 244 may represent a human-in-the-loop with respect to the process of generating recommendations using machine learning models. In some examples, code developers 244 may use the computing devices to generate the computer programming code using a code block generated by the large language model via API for code inference processing 228, using the code block with the greatest performance improvement, using a code efficiency improvement type recommended by performance inference processing for use in code comment prompt for code, and/or manually using the client devices. For example, a human, a computer program, a machine learning model, and/or a large language model may provide inputs that are outputs from API for code inference processing 228. The inputs may be processed inputs from code developers and may provide further optimization and or refinement. The function of APIs is to provide an inference between application code and code inference and performance inference processing. APIs may detail the type and format of data being passed between code inference and performance inference processing.

As indicated above, FIG. 2 is provided as an example. Other examples may differ from what is described with regard to FIG. 2. The number and arrangement of elements shown in FIG. 2 are provided as an example.

FIGS. 3A-3G are diagrams of an example implementation 100 described herein. As shown in FIGS. 3A-3G, example implementation 100 includes processing times data store 140, user device 305, and a generated code data store 310. These devices are described in more detail below in connection with FIG. 4.

Processing times data store 140, user device 105, and generated code data store 310 may form an architecture configured to optimize program code. Processing times data store 140, user device 105, and generated code data store 310 may be connected via wired connections, wireless connections, or a combination of wired and wireless connections. The devices may be connected via a network that includes one or more wired and/or wireless networks. For example, the network may include Ethernet switches. Additionally, or alternatively, the network may include a cellular network, a public land mobile network (PLMN), a local area network (LAN), a wide area network (WAN), a private network, the Internet, and/or a combination of these or other types of networks. The network enables communication between processing times data store 140, user device 105, and generated code data store 310.

User device 105 may include one or more devices configured to receive, generate, store, process, and/or provide information associated with optimizing program code as explained herein. User device 105 may include a communication device and a computing device. For example, user device 105 may include a wireless communication device, a mobile phone, a user equipment, a laptop computer, a tablet computer, a desktop computer, and/or a similar type of device. In some implementations, user device 105 may be a computing device that is part of a computing environment, as described below.

Generated code data store 310 may include one or more devices configured to receive, generate, store, process, and/or provide information associated with optimizing program code as explained herein. For example, generated code data store 310 may include one or more devices configured to store program code. In some examples, generated code data store 310 may be a device similar to code repository 212.

Figure 3A:
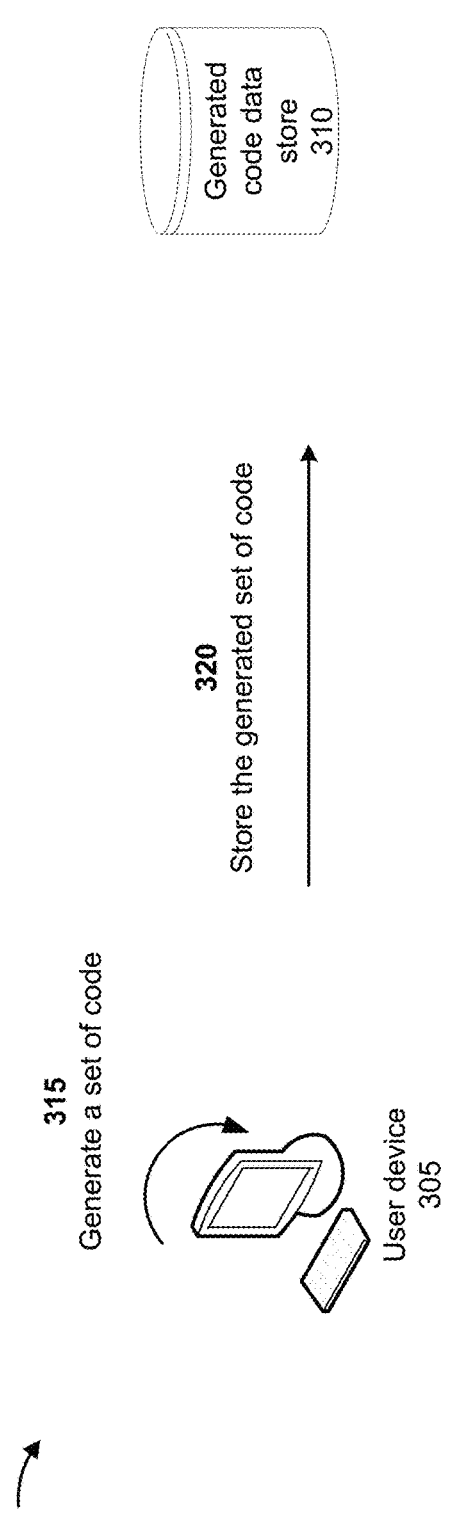

As shown in FIG. 3A, and by reference number 315, user device 305 may generate a set of code. The set of code may be computer programming code, such as program code 110. In some examples, user device 305 may generate the set of code using one or more elements of training and processing implementation 200. For instance, user device 305 may generate the set of code using IDE 242. IDE 242 may be used to create, retrieve, and/or update the set of code.

In some examples, a code developer may use user device 305 and IDE 242 to develop (or create), modify, and/or update the set of code. In some instances, the code developer may use descriptions in the English language (or other languages) to generate the set of code. The set of code may be executed in a testing environment.

As shown in FIG. 3A, and by reference number 320, user device 305 may store the generated set of code. For example, user device 305 may cause the generated set of code to be stored in generated code data store 310. Additionally, or alternatively, user device 305 may cause the generated set of code to be stored in code repository 212.

In some examples, the generated set of code may be optimized to reduce processing times associated with execution of the generated set of code. In this regard, library functions 120 may be used to monitor performance metrics associated with executing the generated set of code. As an example, the performance metrics may include the processing times associated with executing the generated set of code. Additionally, or alternatively, the performance metrics may include CPU usage, memory consumption, GPU usage, among other examples.

As shown in FIG. 3A, library functions 120 may include code to capture program, system, and clock times (e.g., capture_processing_times( )). Additionally, or alternatively, library functions 120 may include code to calculate the difference between start times and end times for the program, system, and clock times (e.g., calculate_processing_times_usage (start, end)). Additionally, or alternatively, library functions 120 may include code to configured to store processing times in a data store (e.g., store_processing_times_usage(application_name, block_name, block_type, code_improvement_type, processing_times, data_store). For example, library functions 120 may include code to configured to store processing times in processing times data store 140.

As shown in FIG. 3B, and by reference number 325, user device 305 may wrap the generated set of code in a library function. In some examples, user device 305 may incorporate an entirety or a portion of library functions 120 in the generated set of code. For instance, user device 305 may import an entirety or a portion of library functions 120 in the generated set of code. Additionally, or alternatively, user device 305 may insert an entirety or a portion of library functions 120 in the generated set of code.

As shown in FIG. 3B, the generated set of code may include code for a program entitled application_x( ). The program may include a function function_a( ). As shown in FIG. 3B, the function function_a( ) may be wrapped in library functions 120. For example, library functions 120 may be imported into the program application_x( ) before the function function_a( ).

As shown in FIG. 3B, a first portion of library functions 120 may precede the code statements of the function function_a( ) and a second portion of library functions 120 may follow the code statements of the function function_a( ). Library functions 120 may wrap one or more functions of application_x( ).

In some examples, the process of inserting and/or importing library functions 120 may be performed using an automated mechanism. In this regard, the process of inserting and/or importing library functions 120 may be expedited.

Figure 3C:
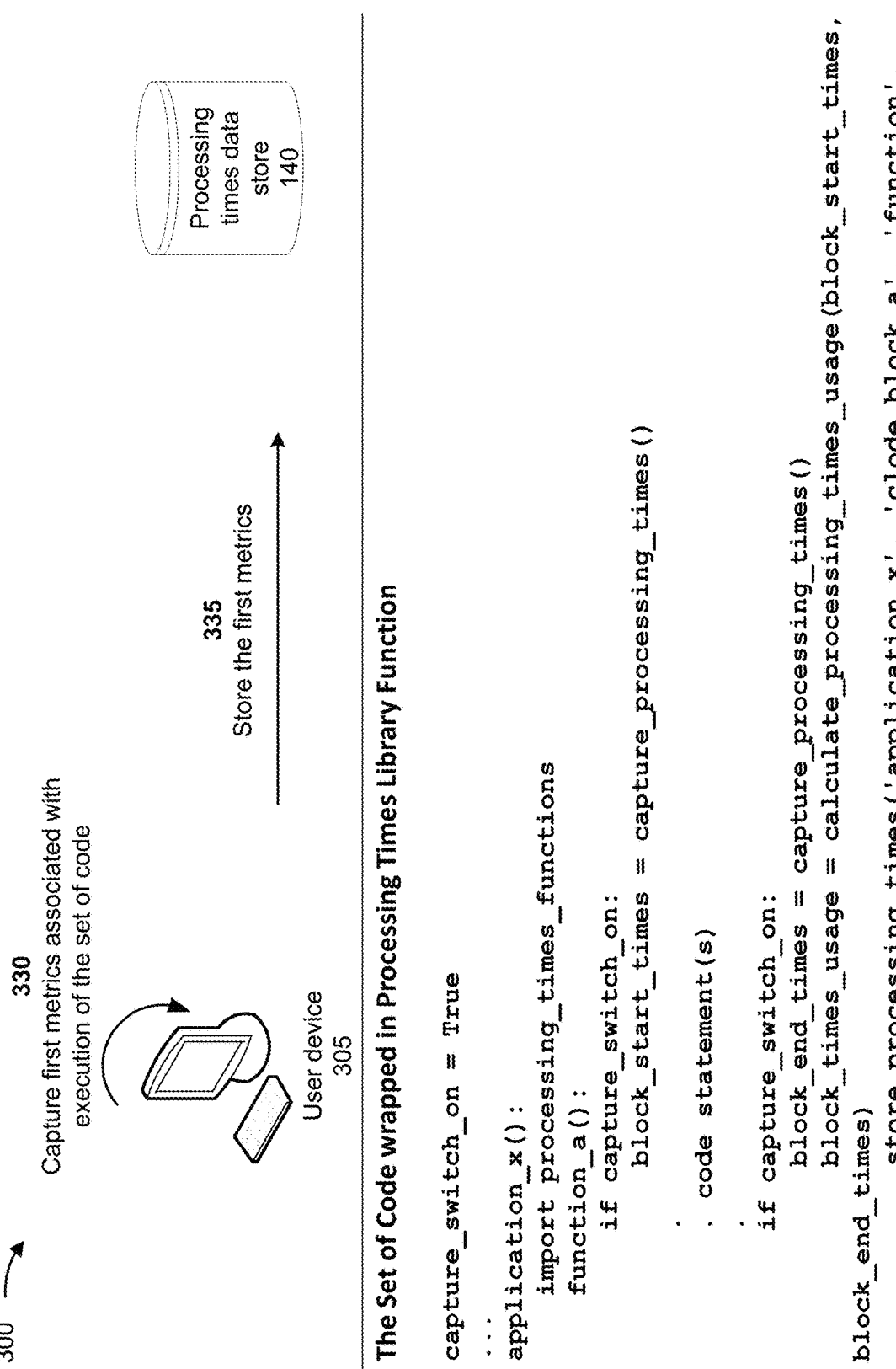

As shown in FIG. 3C, and by reference number 330, user device 305 may capture first metrics associated with execution of the set of code. For example, user device 305 may use library functions 120 to obtain the first metrics (e.g., first performance metrics). As explained herein, the first metrics may include processing times associated with execution of the generated set of code.

As shown in FIG. 3C, user device 305 may obtain (or capture) data to determine the processing time using a command capture_processing_times( ) command. In some examples, the command capture_processing_times( ) may be a system call. As shown in FIG. 3B, the command capture_processing_times( ) may be used to obtain a beginning time and an ending time associated with executing the function function_a( ).

Using the beginning time and the ending time associated with executing the function function_a( ), user device 305 may determine the processing time associated with executing the function. For example, user device 305 may determine the processing time using the command calculate_processing_times_usage.

As shown in FIG. 3C, and by reference number 335, user device 305 may store the first metrics. For example, user device 305 may store information regarding the first metrics in processing times data store 140. In some examples, user device 305 may store the information regarding the first metrics using the command store_processing_times ( ).

As shown in FIG. 3C, user device 305 may store information identifying the application, information identifying a code block associated with the function function_a( ), information identifying a type of the code block (e.g., a function), information identifying a type of improvement associated with the code block, information identifying processing times associated with the code block, and information identifying a data store for storing the information regarding the first metrics.

Figure 3D:
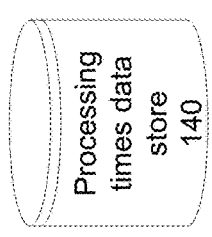
Figure 3D:
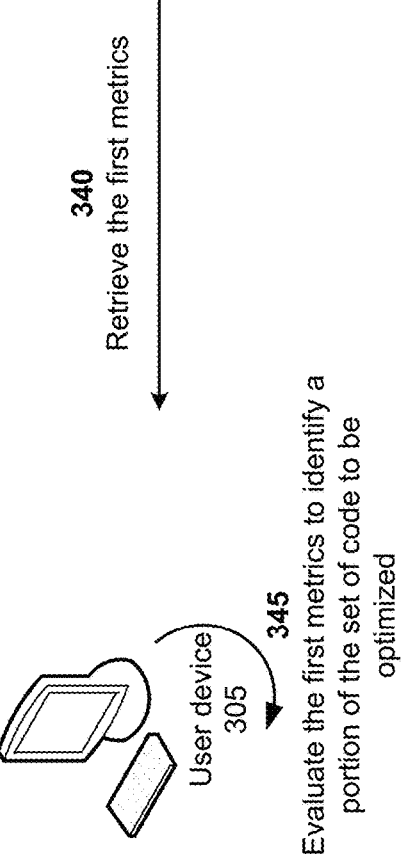

As shown in FIG. 3D, and by reference number 340, user device 305 may retrieve the first metrics. For example, user device 305 may retrieve the first metrics from processing times data store 140 for evaluation.

As shown in FIG. 3D, and by reference number 345, user device 305 may evaluate the first metrics to identify a portion of the set of code. For example, if the first metrics include processing times for different functions of application_x( ), user device 305 may evaluate the processing times to identify a function of application_x(associated with the highest processing time. In this regard, the portion of the set of code may be the function of application_x( ).

Figure 3E:
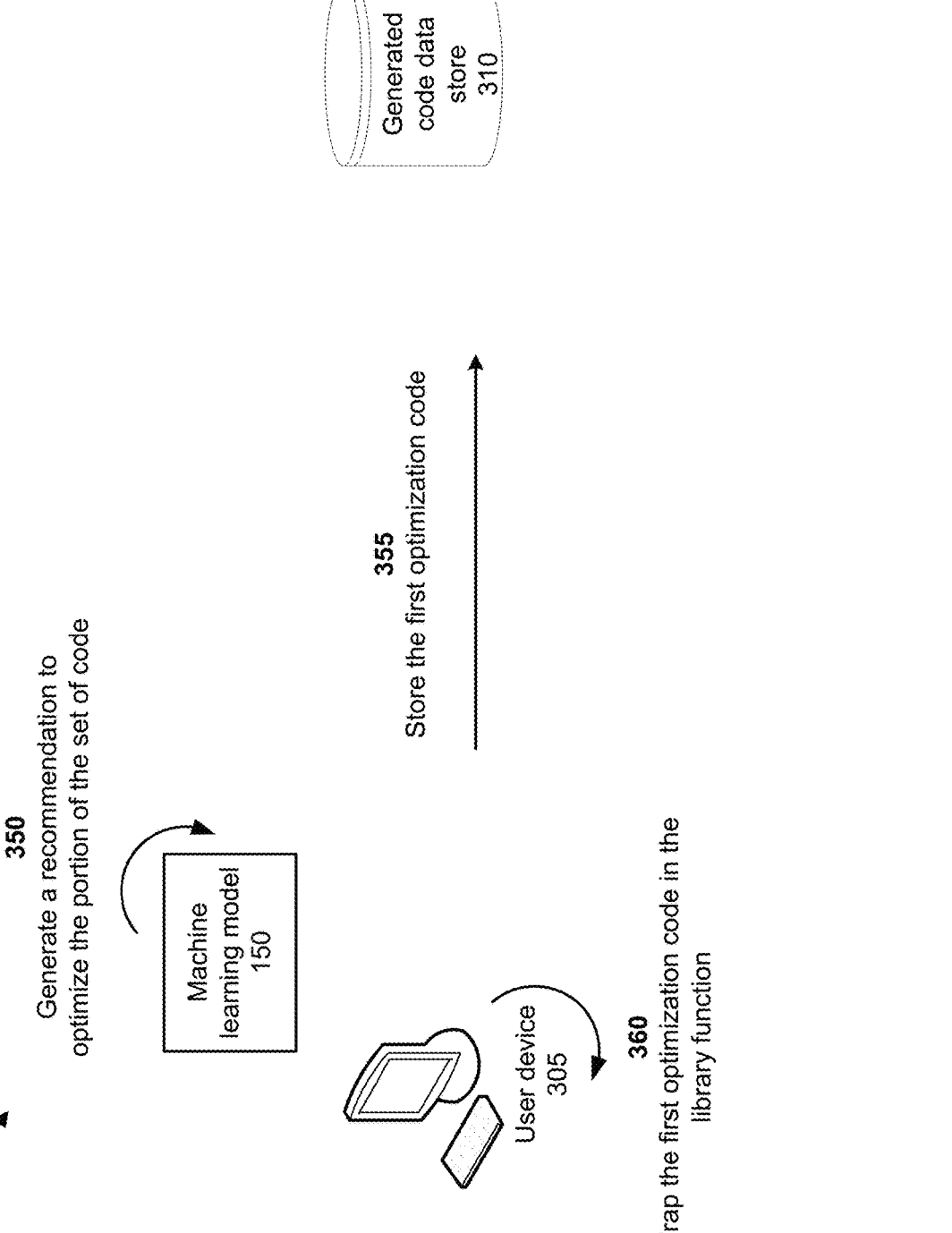

As shown in FIG. 3E, and by reference number 350, user device 305 may generate a recommendation to optimize the portion of the set of code. In some examples, user device 305 may use machine learning model 150 to generate the recommendation. For instance, user device 305 may provide the processing time and the portion of the set of code as inputs to machine learning model 150. Based on the inputs, machine learning model 150 may provide the recommendation as an output.

In some examples, the recommendation may include optimized code that is an optimized version of the portion of the set of code. As an example, the recommendation may be to subdivide the portion of the set of code into subdivided portions of the set of code. Machine learning model 150 may be trained using the trained data that includes historical code, historical processing times associated with execution of the historical code, historical optimized versions of the code, and/or historical processing times associated with execution of the optimized versions of the code.

Based on being trained using the training data, machine learning model 150 may generate first optimized code corresponding to code provided as an output. For example, assume the portion of the set of code is a function for generating a Fibonacci sequence. Further assume machine learning model 150 has been trained with training data regarding different code for generating a Fibonacci sequence.

Machine learning model 150 may analyze the portion of the set of code to determine that the portion of the set of code is a function to generate a Fibonacci sequence. In this regard, machine learning model 150 may generate an optimized code for generating a Fibonacci sequence. In some examples, machine learning model 150 may be further trained using the portion of the set of code, the processing time associated with the portion of the set of code, and the first optimized code.

As shown in FIG. 3E, and by reference number 355, user device 305 may store the first optimized code. For example, user device 305 may store the first optimized code in generated code data store 310, in a manner similar to the manner described above in connection with FIG. 3A. In some situations, user device 305 may provide the first optimized code as the set of code is being developed, modified, and/or updated.

As shown in FIG. 3E, and by reference number 360, user device 305 may wrap the first optimized code in the library function. For example, user device 305 may wrap the first optimized code in library function 120, in a manner similar to the manner described above in connection with FIG. 3B. For instance, user device 305 may wrap the function of the set of code associated with the highest processing time. As part the stepwise refinement process, user device 305 may wrap the function to identify a statement of the function associated with the highest processing time out of processing times of all statements of the function.

Figure 3F:
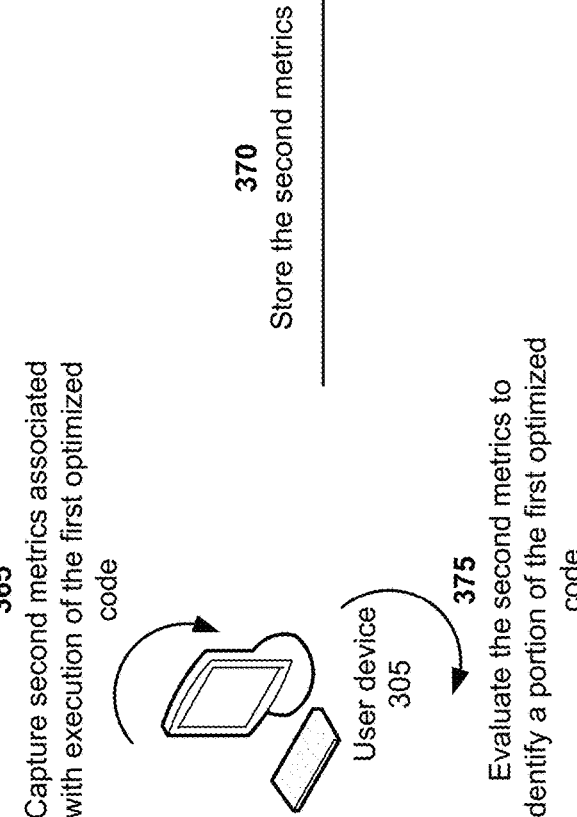

As shown in FIG. 3F, and by reference number 365, user device 305 may capture second metrics associated with execution of the first optimized code. For example, as part of the stepwise refinement, user device 305 may capture the second metrics in a manner to the manner described above in connection with FIG. 3C.

As shown in FIG. 3F, and by reference number 370, user device 305 may store the second metrics associated with execution of the first optimized code. For example, user device 305 may store the second metrics in a manner to the manner described above in connection with FIG. 3C.

As shown in FIG. 3F, and by reference number 375, user device 305 may evaluate the second metrics to identify a portion of the first optimized code. For example, user device 305 may evaluate the second metrics in a manner to the manner described above in connection with FIG. 3D. For instance, as part of the stepwise refinement, user device 305 may evaluate the second metrics to identify one or more statements of the function associated with highest processing times out of processing times of all the statements of the function.

Figure 3G:
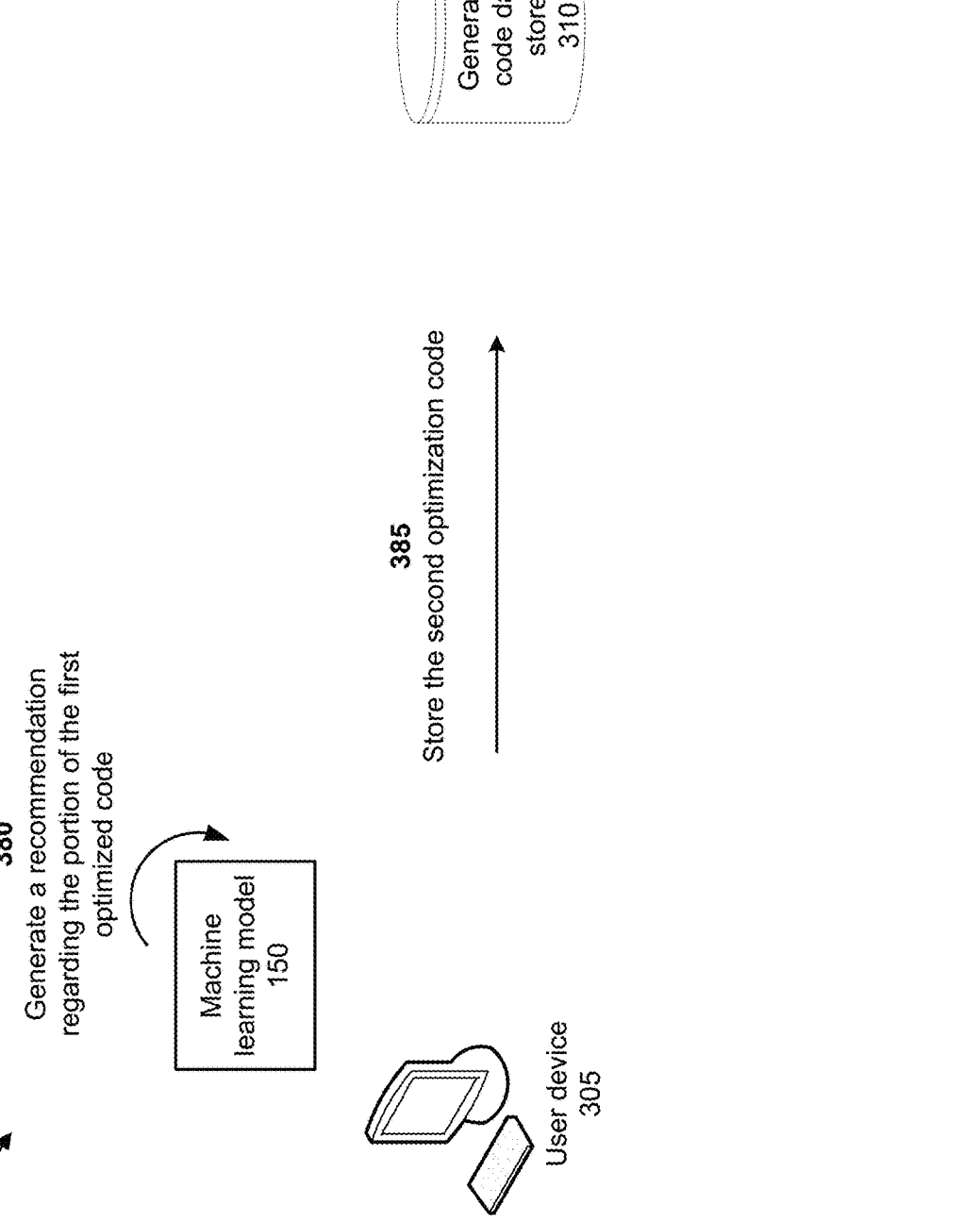

As shown in FIG. 3G, and by reference number 380, user device 305 may generate a recommendation regarding the portion of the first optimized code. For example, as part of the stepwise refinement, user device 305 may generate a second optimized code in a manner to the manner described above in connection with FIG. 3D. In some examples, machine learning model 150 may be further trained using the portion of the first optimized code, the processing time associated with the portion of the first optimized code, and the second optimized code.

As shown in FIG. 3G, and by reference number 385, user device 305 may store the second optimized code. For example, user device 305 may store the second optimized code in generated code data store 310, in a manner similar to the manner described above in connection with FIG. 3A. In some situations, user device 305 may provide the second optimized code as the set of code is being developed, modified, and/or updated.

Implementations described herein may be used in software development, software optimization, and machine learning portfolio. By leveraging machine learning, the proposed method can enable workflows of analysis not previously available due to the lack of visibility into optimal code configurations required to run those workflows.

As indicated above, FIGS. 3A-3G are provided as an example. Other examples may differ from what is described with regard to FIGS. 3A-3G. The number and arrangement of devices shown in FIGS. 3A-3G are provided as an example. A network, formed by the devices shown in FIGS. 3A-3G may be part of a network that comprises various configurations and uses various protocols including local Ethernet networks, private networks using communication protocols proprietary to one or more companies, cellular and wireless networks (e.g., Wi-Fi), instant messaging, Hypertext Transfer Protocol (HTTP) and simple mail transfer protocol (SMTP), and various combinations of the foregoing.

There may be additional devices (e.g., a large number of devices), fewer devices, different devices, or differently arranged devices than those shown in FIGS. 3A-3G. Furthermore, two or more devices shown in FIGS. 3A-3G may be implemented within a single device, or a single device shown in FIGS. 3A-3G may be implemented as multiple, distributed devices. Additionally, or alternatively, a set of devices (e.g., one or more devices) shown in FIGS. 3A-3G may perform one or more functions described as being performed by another set of devices shown in FIGS. 3A-3G.

Figure 4:
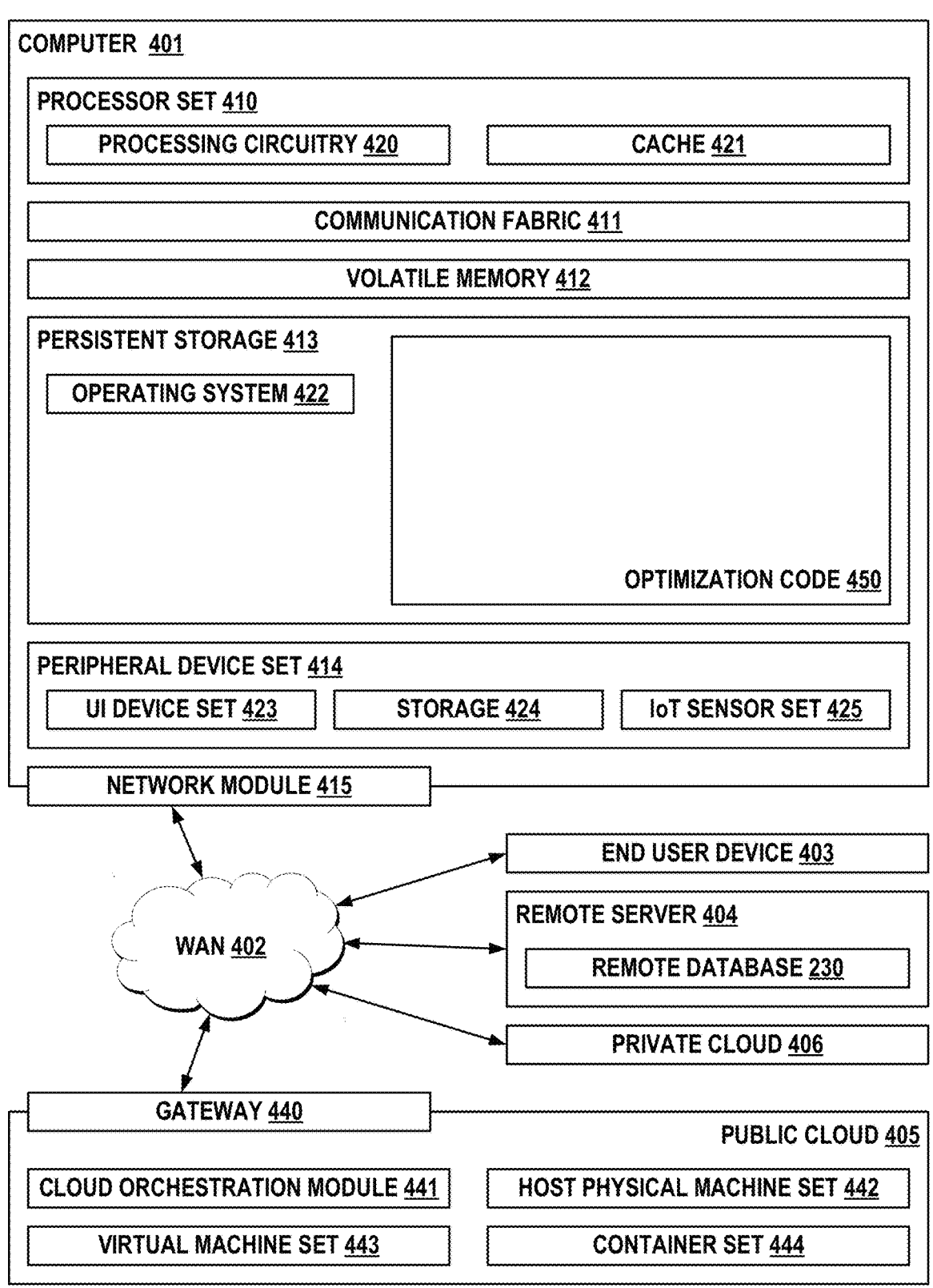
FIG. 4 is a diagram of an example computing environment in which systems and/or methods described herein may be implemented.

FIG. 4 is a diagram of an example computing environment 400 in which systems and/or methods described herein may be implemented. Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as optimization code 450. In addition to block 450, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 450, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 450 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in block 450 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401) and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Figure 5:
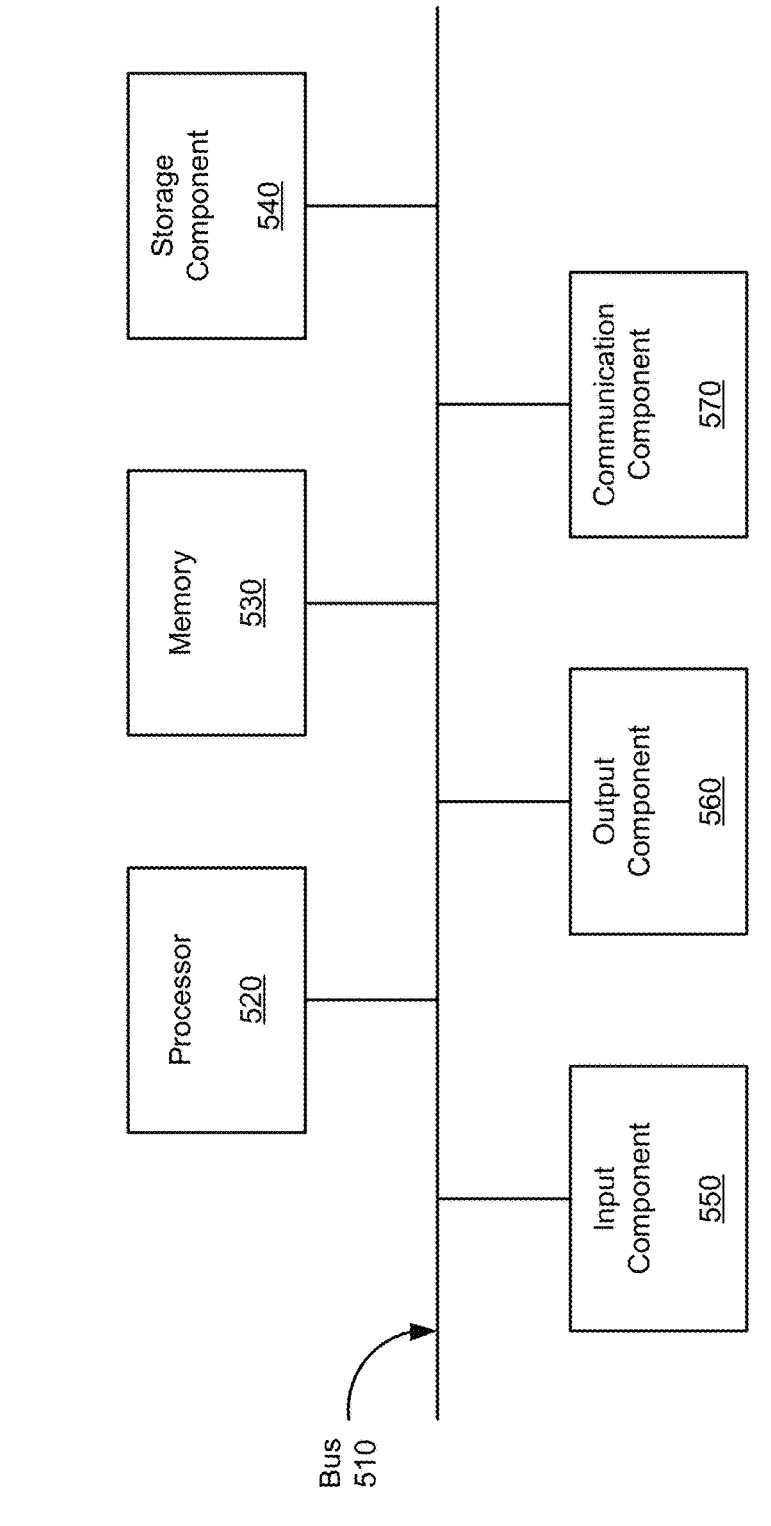
FIG. 5 is a diagram of example components of one or more devices of FIG. 1.

FIG. 5 is a diagram of example components of a device 500, which may correspond to user device 105. In some implementations, user device 105 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
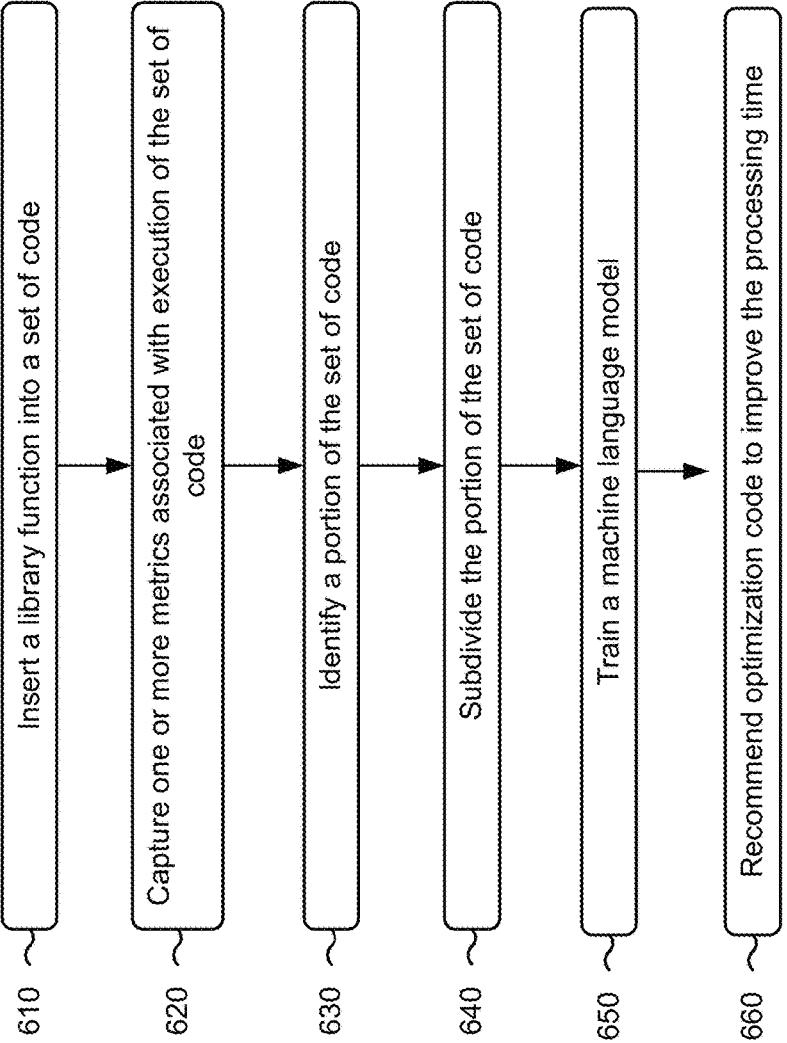
FIG. 6 is a flowchart of an example process associated with iteratively optimizing program code using a machine learning model.

FIG. 6 is a flowchart of an example process 600 associated with iteratively optimizing program code using a machine learning model. In some implementations, one or more process blocks of FIG. 6 may be performed by a user device (e.g., user device 105). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include inserting a library function into a set of code (block 610). For example, the user device may insert a library function into a set of code, as described above.

As further shown in FIG. 6, process 600 may include capturing one or more metrics associated with execution of the set of code (block 620). For example, the user device may capture, using the library function, one or more metrics associated with execution of the set of code in a testing environment, as described above.

As further shown in FIG. 6, process 600 may include identifying a portion of the set of code (block 630). For example, the user device may identify, based on the one or more metrics, a portion of the set of code with a processing time that is highest compared to processing times of other portions of the set of code, as described above.

As further shown in FIG. 6, process 600 may include subdividing the portion of the set of code (block 640). For example, the user device may subdivide the portion of the set of code into subdivided portions of the set of code, as described above.

As further shown in FIG. 6, process 600 may include training a machine learning model (block 650). For example, the user device may train a machine learning model, utilizing the subdivided portions of the set of code, to obtain a trained model, as described above.

As further shown in FIG. 6, process 600 may include recommending optimization code to improve the processing time (block 660). For example, the user device may recommend, using the trained machine learning model, optimization code to improve the processing time as the set of code is modified, as described above.

In some implementations, process 600 may include determining a current decomposition rate of the 3D printed object based on monitoring the decomposition process; comparing a historical decomposition rate of the 3D printed object and the current decomposition rate; determining a difference between the historical decomposition rate and the current decomposition rate; and updating the historical decomposition rate, based on the current decomposition rate. The adjusted historical decomposition rate is to adjust the design of the subsequent 3D printed objects.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A computer-implemented method for optimizing computer code, the computer-implemented method comprising:
modifying a set of code by inserting a library function into the set of code;
executing, in a testing environment, the set of code with the library function;
capturing, using the library function, one or more metrics associated with execution of the set of code in the testing environment,
the one or more metrics being captured during the execution of the set of code;
iteratively analyzing the set of code to identify, based on the one or more metrics, a portion of the set of code with a processing time that is highest compared to processing times of other portions of the set of code,
the portion of the set of code being identified to improve processing times of the set of code;
iteratively training a machine learning model, utilizing training data associated with the set of code, to obtain a trained machine learning model; and
iteratively recommending, using the trained machine learning model, optimization code to improve the processing time as the set of code is being modified,
wherein iteratively recommending the optimization code comprises generating the optimization code.

2. The computer-implemented method of claim 1, wherein inserting the library function comprises:
wrapping the set of code into library code of the library function by:
inserting a first portion of the library code prior to the set of code, and
inserting a second portion of the library code after the set of code.

3. The computer-implemented method of claim 1, wherein iteratively recommending the optimization code comprises:
generating a recommendation, for the optimization code, using stepwise refinements to identify the optimization code that reduces the processing time.

4. The computer-implemented method of claim 1, wherein iteratively recommending the improvement code comprises:
generating, using a large language model, optimization code to replace the set of code.

5. The computer-implemented method of claim 1, wherein training the machine learning model comprises:
training a large language model utilizing the subdivided portions of the code.

6. The computer-implemented method of claim 1, wherein identifying a portion of the set of code comprises:
identifying a code loop.

7. The computer-implemented method of claim 1, wherein identifying a portion of the set of code comprises:
identifying a machine learning inference.

8. A computer program product comprising:

one or more computer readable storage media, and program instructions collectively stored on the one or more computer readable storage media, the program instructions comprising:

program instructions to modify a set of code by inserting performance monitoring code of a library function into the set of code running in a testing environment;

program instructions to execute the set of code;

program instructions to capture, using the performance monitoring code, performance metrics associated with execution of the set of code;

program instructions to iteratively analyze a plurality of code blocks of the set of code identify, based on the performance metrics, a code block, of the plurality of code blocks, with a processing time that is highest among processing times of the plurality of code blocks, the plurality of code blocks being iteratively analyzed to improve a processing time of the set of code;

program instructions to iteratively train a machine learning model, utilizing training data associated with the set of code, to obtain a trained machine learning model; and program instructions to generate, using the trained machine learning model, optimization code to improve the processing time of the set of code.

9. The computer program product of claim 8, wherein the program instructions to generate the recommendation comprise:

program instructions to generate, using a large language model, the optimization code to replace the set of code.

10. The computer program product of claim 8, wherein the program instructions to generate the recommendation comprise:

program instructions to generate the optimization code using stepwise refinements to reduce the processing time of the set of code.

11. The computer program product of claim 8, wherein the program instructions to capture the performance metrics comprise:

program instructions to obtain processing time data per lines of the set of code.

12. The computer program product of claim 8, wherein the set of code is a first set of code, wherein the machine learning model is trained using the training data, that includes the first set of code, to generate recommendations to reduce processing times for code associated with the first set of code, and wherein the program instructions further comprise program instructions to generate, using the trained machine learning model, a recommendation for a second set of code to reduce a processing time of the second set of code.

13. The computer program product of claim 8, wherein the processing time includes a processing time used by an application software associated with the set of code.

14. The computer program product of claim 8, wherein the processing time includes a processing time used by an operating system associated with the set of code.

15. The computer program product of claim 8, wherein the performance metrics include the processing time, a memory usage, and a central processing unit usage.

16. A system comprising:

one or more devices configured to:

modify a set of code by inserting performance monitoring code into a set of code;

execute the set of code with the performance monitoring code;

capture, using the performance monitoring code, performance metrics associated with execution of the set of code;

iteratively analyze a plurality of code blocks of the set of code to identify, based on the performance metrics, a code block, of the plurality of code blocks, with a processing time that is highest among processing times of the plurality of code blocks, the plurality of code blocks being iteratively analyzed to reduce processing times of the set of code;

iteratively train a machine learning model, utilizing training data associated with the set of code, to obtain a trained machine learning model;

iteratively generate, using the trained machine learning model, optimization code that reduces the processing time; and cause the optimization code to replace the set of code to reduce the processing time.

17. The system of claim 16, wherein the processing time includes a clock time used by an application software associated with the set of code.

18. The system of claim 16, wherein the machine learning model includes a large language model, and wherein the one or more devices are further configured:

generate, using the large language model, a recommendation to divide the set of code to reduce the processing time.

19. The system of claim 18, wherein the one or more devices, to generate the optimization code, are further configured to:

generate, using the large language model, the optimization code to replace the set of code.

20. The system of claim 16, wherein the one or more devices are further configured to:

store the code block and the performance metrics in a data repository;

obtain the code block and the performance metrics from the data repository; and train the machine learning model, using the code block and the performance metrics obtained from the data repository, to obtain the trained machine learning model, wherein the trained machine language model is trained to predict improvements to code.

* * * * *